United States Patent Office 3,376,306
Patented Apr. 2, 1968

3,376,306
1-CARBOXAMIDO-3-AMINO-1,2,4-TRIAZOLES AND A PROCESS FOR THEIR PREPARATION
John R. Roland, Wilmington, Del., assignor to E. I. du Pont de Nemours and Company, Wilmington, Del., a corporation of Delaware
No Drawing. Continuation-in-part of application Ser. No. 242,636, Dec. 6, 1962. This application Aug. 11, 1964, Ser. No. 388,949
11 Claims. (Cl. 260—294)

This invention relates to new heterocyclic compounds and particularly to 1,2,4 - triazoles having a carbamyl group on nuclear nitrogen and an amino substituent on nuclear carbon and pharmaceutical compositions thereof.

This application is a continuation-in-part of my co-pending application Ser. No. 242,636, filed Dec. 6, 1962, and now abandoned.

Heterocyclic compounds are an important class of organic products. Of these the triazoles have been found to have varied utility. For example, Potts, Chem. Revs., 61, 87–127 (1961), shows that various 1,2,4 - triazoles have found commercial application as herbicides, defoliants, photographic reagents, rubber chemicals and in polymers.

There have now been obtained new and useful 1,2,4-triazoles having a tertiary carbamyl group on nuclear nitrogen. The carbamyl nitrogen is also attached to two different saturated aliphatic carbons, and one of the nuclear carbons in the triazole ring is bonded to amino, substituted amino or a group hydrolyzable thereto. The new compounds are useful as analgesics.

The new compounds of this invention can be represented by the formula

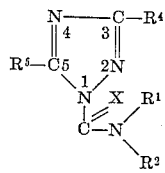

wherein
(A) X is oxygen or sulfur,
(B) $R^1$ and $R^2$
(1) individually are aliphatic groups such that, $R^1$ is methyl and $R^2$ is alkyl, alkenyl alkoxyalkyl, hydroxyalkyl, or methylalkylamino each having a total of no more than 6 carbons, alkylaminoalkyl having a total of up to 8 carbons, carbalkoxyalkyl having up to 4 carbons in the alkoxy and up to 6 carbons in the alkyl, carbonamidoalkyl having up to 6 carbons in the alkyl and no more than 5 in the amido moiety, and cyanoalkyl having up to 6 carbons in the alkyl; and
(2) jointly, form with the carbamyl nitrogen a heterocyclic structure including:

morpholino 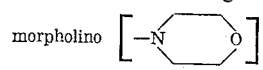

pyrrolidyl 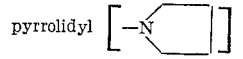

piperidyl 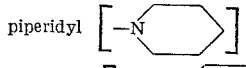

dehyropiperidyl 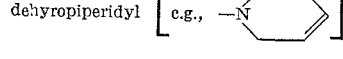

-3-azabicylco(3.2.2)nonyl 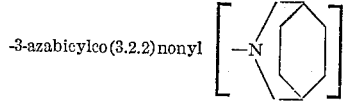

and monosubstituted piperidyl of the formula

wherein two of the Y's are hydrogen and the remaining selected such that
$Y_1$ is H or $CH_3$,
$Y_2$ is H, $CH_3$, $C_2H_5$, or $COOR^3$ where $R^3$ is an alkyl of 1 to 4 carbons,
$Y_3$ is H, OH, alkyl, cycloalkylalkyl, hydroxyalkyl, alkoxyalkyl of up to 9 carbons, trifluoromethyl, carbalkoxy ($COOR^3$) where the alkoxy has up to 4 carbons, carboxyalkyl, carbonamido ($—CCONR^6R^7$) having up to two 1–4 carbon alkyls attached to amide nitrogen, dialkylcarbonamidoalkyl and dialkylaminoalkyl where each alkyl of the dialkyl portion has up to 2 carbons and the remaining alkyl up to 4 carbons, pyrrolidinomethyl and arylalkyl of up to 9 carbons, or disubstituted piperidines according to the preceding formulas where $Y_1$ is H and $Y_2$ and $Y_3$ are other than hydrogen and selected from the above substituents;
(C) $R^4$ is amino, alkylamino, dialkylamino, or a group hydrolyzable thereto, i.e., $R^4$ can be $—NH_2$, $NHR^6$, $NR^6R^7$ where $R^6$ and $R^7$ are alkyl of up to 1–4 carbons or aryl of 6–10 carbons, and $NR^8COR^9$ wherein $R^8$ is hydrogen or alkyl of 1–4 carbons and $R^9$ is hydrogen, alkyl of 1–4 carbons, aryl of 6–10 carbons, carboxyalkyl of up to 6 carbons, perfluoroalkyl of up to 4 carbons, or haloalkyl of up to 4 carbons, and

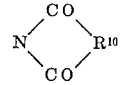

wherein $R^{10}$ is alkylene 2–5 carbon atoms; and
(D) $R^5$ is hydrogen, halogen (fluorine, chlorine or bromine), alkyl of up to 4 carbons, alkoxy of up to 4 carbons, carboxy, or carbamyl ($CONH_2$).

Particularly preferred for their analgesic activity are 1,2,4-triazoles in which $R^1$ and $R^2$ are hydrocarbyl of up to 7 carbons together and particularly those where $R^1$ is $CH_3$, $R^2$ is a 1–4 carbon alkyl, $R^4$ is

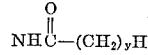

and $R^5$ is H, y being 0 or 1, i.e., compounds of the structure

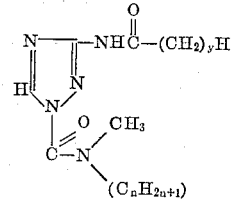

where $n$ is an integer of 1–4.

The new substituted triazoles can be prepared by reaction of an aminotriazole having hydrogen on nuclear nitrogen with an N-disubstituted carbamyl halide in the presence of an acid acceptor, such as a tertiary amine, after conversion of the triazole to the corresponding alkali metal salt, e.g., by treatment with a metal hydride before reaction with the carbamyl halide.

An additional method involves reaction of the sodium salt of aminotriazole with phosgene to give the corresponding triazole carbonyl halide. The latter compound upon reaction with an excess of a secondary amine gives the N-disubstituted carbamyltriazoles.

By use of thiocarbamyl chloride or thiophosgene, the corresponding thiocarbamyl compounds are obtained.

The following examples in which the parts are by weight unless further specified further illustrate the preparation and properties of new compounds within the scope of this invention.

Example I.—1-N,N-dimethylcarbamyl-3-amino-1,2,4-triazole

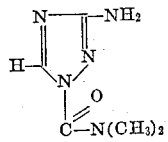

A suspension of 21 parts of crystallized 3-amino-1,2,4-triazole and 500 parts by volume of tetrahydrofuran was stirred at room temperature while adding 11.2 parts of 53.5% sodium hydride in small portions. The mixture was stirred at room temperature for 30 minutes, then refluxed for one hour. The mixture was next cooled to room temperature and 26.9 parts of dimethylcarbamyl chloride added over a 40-minute period. Stirring at room temperature was continued for an additional 30 minutes. Following this, the reaction mixture was stirred and refluxed for six hours. The mixture was cooled to room temperature and filtered, yielding only a small amount of solid. The filtrate was evaporated to dryness and the residue crystallized from benzene to give 27 parts of material melting at 99–100° C. Recrystallization of a small portion from benzene raised the melting point to 103–104° C.

Analysis.—Calcd. for $C_5H_9N_5O$: C, 38.7; H, 5.9; N, 45.1. Found: C, 38.9; H, 5.7; N, 46.9.

Recrystallization of the main portion from the filtrate yielded material melting at 97–98° C. Examination of the material by nuclear magnetic resonance in deuterochloroform solution with tetramethylsilane as internal standard showed that the material consisted of a mixture of two isomers, 1-dimethylcarbamyl-3-amino-1,2,4-triazole and 1-dimethylcarbamyl-5-amino-1,2,4-triazole in the approximate ratio of 2:1. The n-m-r spectrum had peaks at $\tau$ values of 6.78 for methyl groups, two amino peaks at $\tau$ 4.75 and 3.05, and two CH peaks at $\tau$ values of 2.55 and 1.45.

Pure 1 - N,N - dimethylcarbamyl-3-amino-1,2,4-triazole was obtained for characterization by removal of the benzal group from 1-dimethylcarbamyl-3-p-dimethylaminobenzalamino-1,2,4-triazole by reaction with 2,4-dinitrophenylhydrazine in absolute alcohol containing a small amount of concentrated hydrochloric acid by boiling gently on the hot plate for 20 minutes. The mixture was cooled and filtered to give a dark maroon 2,4-dinitrophenylhydrazone of p-dimethylaminobenzaldehyde as crystals. The filtrate was evaporated and the residual oil recrystallized from benzene. 1-dimethylcarbamyl-3-amino-1,2,4-triazole melted at 115–116° C. Two further recrystallizations from benzene gave a melting point of 116–116.4° C. The n-m-r spectrum in deuterochloroform (tetramethylsilane internal standard) gave three peaks at $\tau$ values of 6.76, 5.22, and 1.45 having areas in the ratio of 3:2:1. The infrared spectrum had absorption bands at 3410, 3370, 3230, 1720, 1650, and 1570 cm.$^{-1}$.

The 1-N,N-dimethylcarbamyl-3-p-dimethylaminobenzalamino-1,2,4-triazole was obtained as follows: A suspension of 32.5 parts of p-dimethylaminobenzalamino-1,2,4-triazole in 500 parts of tetrahydrofuran was treated with 6.7 parts of 53.5% sodium hydride in mineral oil. The mixture was refluxed for 40 minutes and then cooled to room temperature. Next 16.2 parts of dimethylcarbamyl chloride was dropped in over a 25-minute period, following which the mixture was refluxed for 6½ hours. The solvent was then removed in vacuum and the residue crystallized from ethanol. This yielded 25.4 parts of 1-dimethylcarbamyl-3-p-dimethylaminobenzalamino-1,2,4-triazole melting at 156–157° C.

Analysis.—Calcd. for $C_{14}H_{18}N_6O$: C, 58.7; H, 6.3; N, 29.4. Found: C, 58.9; H, 6.2; N, 30.1.

The p-dimethylaminobenzalamino-1,2,4-triazole was obtained as follows: A mixture of 37.2 parts of p-dimethylaminobenzaldehyde and 21 parts of 3-amino-1,2,4-triazole in alcoholic solution containing a drop of acetic acid was heated on the steam bath for 30 minutes. This yielded 32.5 parts of p-dimethylaminobenzalamino-1,2,4-triazole melting at 233–235° C.

Example II.—1-N,N-dimethylcarbamyl-3-acetamido-1,2,4-triazole

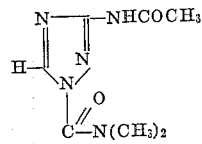

A mixture of 84 parts of 3-amino-1,2,4-triazole and 117 parts of acetic anhydride was heated to reflux for 20 minutes. The mixture was cooled to about 40° and poured into 100 parts of a mixture of ice and water. The aqueous mixture was heated on the steam bath for two hours. The solid 3-acetamido-1,2,4-triazole was filtered and dried in a vacuum oven at 90°. This yielded 96 parts of material melting at 292–293°. Recrystallization raises the melting point to 295°. The carbonyl group absorbs in the infrared at 1690 cm.$^{-1}$.

A mixture of twenty-five parts of 3-acetamido-1,2,4-triazole in 500 parts of tetrahydrofuran was stirred at room temperature with exclusion of moisture while adding 8.9 parts of 53.5% sodium hydride in mineral oil in portions over a 20-minute period. The mixture was stirred at room temeprature for 40 minutes, then heated to reflux for one hour. The mixture was cooled and 23.5 parts of dimethylcarbamyl chloride dropped in over a 40-minute period. After stirring at room temperature for 40 minutes, the mixture was heated to reflux for 16 hours. The solvent was evaporated and the solid residue crystallized from xylene to give 25.4 parts of 1-dimethylcarbamyl-3-acetamido-1,2,4-triazole melting at 140.6–141.8° and having the n-m-r spectrum.

| Group | $\tau$ | Relative Area |
|---|---|---|
| CH$_3$CO | 7.68 | 3 |
| (CH$_3$)$_2$N | 6.76 | 6 |
| 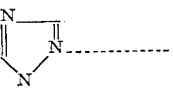 | 1.29 | 1 |
| H$_3$CON— (H) | 0.14 | 1 |

The occurrence of the cyclic proton resonance at $\tau$ 1.29 that the dimethylcarbamyl entered on N$^1$ to give the 3-acetamido isomer rather than on N$^2$ to give the 5-acetamido isomer.

The infrared shows acetyl absorption at 1690 cm.$^{-1}$ and the carbamyl CO at 1730 cm.$^{-1}$.

Analysis.—Calcd. for $C_7H_{11}N_5O_2$: C, 42.6; H, 5.6; N, 35.3. Found: C, 42.6; H, 5.8; N, 34.9.

A solution of 10 parts of 1-dimethylcarbamyl-3-amino-1,2,4-triazole in 300 parts of benzene with 5.2 parts of pyridine was treated with 5.1 parts of acetyl chloride. The mixture was stirred at room temperature for 30 minutes, then heated to reflux for three hours. The hot mixture was filtered and the filtrate evaporated to dryness. The solid residue was crystallized from toluene. This gave 1.9 parts of 1-dimethylcarbamyl-3-acetamido-1,2,4-triazole, M.P. 140.6°–142° (unchanged M.P. on admixture with product prepared above). The solid from the filtration was extracted with toluene and crystallized to yield an additional one part of product having the same melting point. This product had n-m-r and infrared spectra identical with those above and confirms the structure as assigned.

Example III.—1-N,N-dimethylcarbamyl-3-n-butyramido-1,2,4-triazole

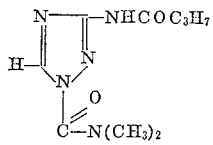

A solution of 9.7 parts of 3-butyramido-1,2,4-triazole in 200 parts of tetrahydrofuran was stirred at room temperature while adding 2.9 parts of sodium hydride (53.5% in mineral oil) in portions. Stirring at room temperature was continued for 20 minutes, then the mixture refluxed for 17 hours. The solvent was evaporated and the product crystallized from ethyl acetate to yield 3.8 parts of 1-dimethylcarbamyl-3-butyramido-1,2,4-triazole melting at 226–228°.

*Analysis.*—Calcd. for $C_9H_{15}N_5O_2$: N, 31.1. Found: N, 31.5.

The butyramidotriazole was obtained by adaptation of the procedure of Birkhofer, Ber., 76B, 679 (1943). A mixture of 100 parts of n-butyric anhydride and 26 parts of 3-amino-1,2,4-triazole was heated on the hot plate for 10 minutes. The triazole dissolved and the solution boiled during the latter portion of the heating period. The mixture was allowed to stand overnight and the solid product that crystallized was washed with ether and recrystallized from alcohol. This yielded 16.5 parts of 3-butyramido-1,2,4-triazole melting at 230–231°. The carbonyl absorption of the infrared spectrum was at 1690 cm.$^{-1}$ showing that the 1-butyryl group had been hydrolyzed during the isolation.

*Analysis.*—Calcd. for $C_6H_{10}N_4O$: —C, 46.7; H, 6.5; N, 36.3. Found: C, 46.8; H, 7.1; N, 36.7.

Example IV.—1-N,N-dimethylcarbamyl-3-benzamido-1,2,4-triazole

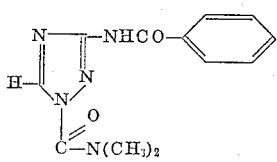

A mixture of 20.4 parts of 3-benzamido-1,2,4-triazole in 500 parts by volume of tetrahydrofuran was stirred at room temperature under exclusion of moisture. Portionwise addition of 9.4 parts of 53.5% sodium hydride in mineral oil was carried out over a 20-minute period following which stirring was continued for 30 minutes. Next the mixture was refluxed for one hour. The mixture was then cooled and 24.6 parts of dimethylcarbamyl chloride dropped in over a 30-minute period. The mixture was stirred at room temperature for 30 minutes, then refluxed for eight hours. The precipitated salt was filtered and the filtrate evaporated to dryness. The solid residue was crystallized from ethyl acetate to yield 10.3 parts of 1-dimethylcarbamyl-3-benzamido-1,2,4-triazole, melting at 145–146° and having the carbamyl carbonyl infrared absorption at 1720 cm.$^{-1}$. The benzamido carbonyl appeared as a shoulder near 1690 cm.$^{-1}$.

*Analysis.*—Calcd. for $C_{12}H_{13}N_5O_2$: C, 55.6; H, 5.1; N, 27.0. Found: C, 55.1; H, 5.0; N, 26.4.

The 3-benzamido-1,2,4-triazole was obtained according to the general procedure in the preceding example using 108 parts of benzoic anhydride and 18.5 parts of 3-amino-1,2,4-triazole. This yielded 31.8 parts of 3-benzamido-1,2,4-triazole melting at 285–285.5° C.

*Analysis.*—Calcd. for $C_9H_8N_4O$: C, 57.4; H, 4.3; N, 29.7. Found: C, 57.5; H, 4.5; N, 28.9.

The infrared spectrum had a single carbonyl at 1670 cm.$^{-1}$ showing the benzoyl group was attached to the amino group.

Example V.—1-(1-pyrrolidinecarbonyl)-3-amino-1,2,4-triazole

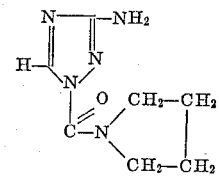

A mixture of 20 parts of 3-p-dimethylaminobenzalamino-1,2,4-triazole (see Example I) in 500 parts of tetrahydrofuran was stirred at room temperature while adding 4.2 parts of sodium hydride (53.5% in mineral oil) in portions over a 20-minute period. Stirring at room temperature was continued for 20 minutes, then the mixture refluxed for one hour. The mixture was cooled and 12.6 parts of pyrrolidine-1-carbonyl chloride dropped in over a period of 25 minutes, then the mixture refluxed for seven hours. The solvent was evaporated to dryness to give 38 parts of crude 1-(1-pyrrolidinecarbonyl)-3-p-dimethylaminobenzalamino-1,2,4-triazole, which was dissolved in 10,000 parts of denatured alcohol and treated with a solution of 18.4 parts of 2,4-dinitrophenylhydrazine dissolved in alcohol. The mixture was heated on the steam bath for one hour. The cooled mixture was filtered from the precipitated 2,4-dinitrophenyl hydrazone of p-dimethylaminobenzaldehyde and the filtrate concentrated to small volume. The concentrated filtrate crystallized to a mixture of residual traces of hydrazone (red) and the triazole (colorless). The product was filtered and recrystallized from toluene to give 5.3 parts of 1-(1-pyrrolidinecarbonyl)-3-amino-1,2,4-triazole melting at 144–146°.

*Analysis.*—Calcd. for $C_7H_{11}N_5O$: C, 46.4; H, 6.1; N, 38.7. Found: C, 46.5; H, 6.2; N, 38.0.

Example VI.—1-(N-pyrrolidinecarbonyl)-3-acetamido-1,2,4-triazole

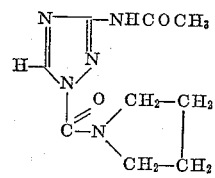

A mixture of 24 parts of 3-acetamido-1,2,4-triazole (see Example II) in 500 parts of tetrahydrofuran was treated with 8.6 parts of sodium hydride (53.5% in mineral oil) in portions over a 20-minute period. The mixture was then refluxed for one hour. The mixture was next cooled and 26.8 parts of pyrrolidyl-1-carbonyl chloride dropped in over a 20-minute period. Stirring at room temperature was continued for 40 minutes, then the mixture stirred and refluxed for six hours. The solvent was evaporated and the solid residue crystallized from xylene to yield 29.9 parts of 1-(1-pyrrolidinecarbonyl)-3-acetamido-1,2,4-triazole melting at 162.5–163.5°.

*Analysis.*—Calcd. for $C_9H_{13}N_5O_2$: C, 48.4; H, 5.9; N, 31.4. Found: C, 48.5; H, 6.7; N, 30.8.

Example VII.—N-(1-dimethylcarbamyl-3-[1,2,4-triazol]yl)succinamic acid

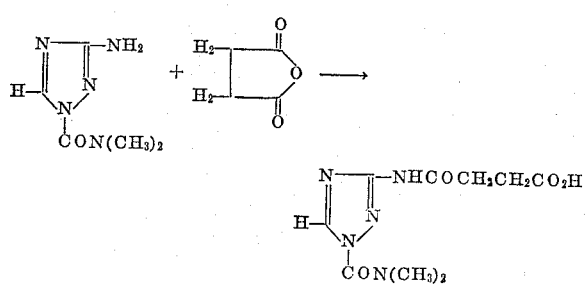

A mixture of 15.5 parts of 1-dimethylcarbamyl-3-amino-1,2,4-triazole (see Example I), 11 parts of succinic anhydride, and 117.5 parts of acetonitrile was heated under reflux for three hours. The solvent was evaporated and the crystalline residue was recrystallized from absolute ethanol to give 19.5 parts of N-(1-dimethylcarbamyl-3-[1,2,4-triazol]yl)succinamic acid, M.P. 181–182°. A sample prepared for analysis by two additional crsystallizations from absolute ethanol melted at 186–187°.

*Analysis.*—Calcd. for $C_9H_{13}N_5O_4$: C, 42.3; H, 5.13; N, 27.4. Found: C, 42.8; H, 5.23; N, 27.7.

Example VIII.—1-N,N-dimethylcarbamyl-3-succinimido-1,2,4-triazole

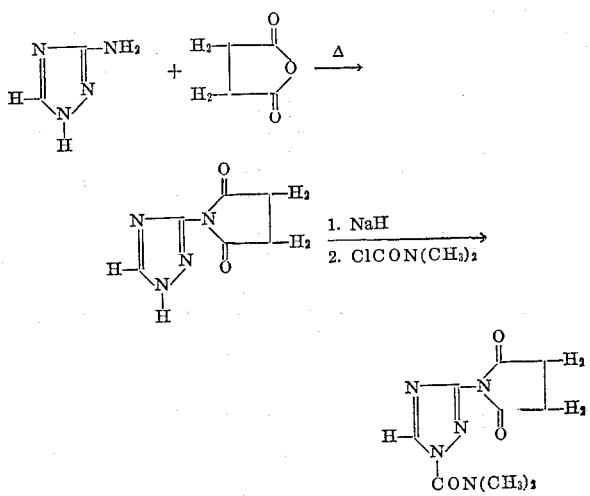

To a suspension of five parts of 56% sodium hydride dispersion in 280 parts of tetrahydrofuran was added 16.6 parts of 3-succinimido-1,2,4-triazole of M.P. 302–302.5° C., which was prepared by heating 3-amino-1,2,4-triazole with succinic anhydride in decalin. The mixture was heated at reflux for 20 hours. A solution of 11 parts of dimethylcarbamyl chloride in 70 parts of tetrahydrofuran was added and refluxing continued for an additional five hours. The mixture was filtered and the filtrate was freed of solvent by distillation. The oil that remained crystallized when it was triturated with about 70 parts of petroleum ether. This solid was collected and crystallized twice from absolute alcohol to give 10.8 parts of 1-dimethylcarbamyl-3-succinimido-1,2,4-triazole, M.P. 137.6–138.0° C.

A sample, M.P. 137.8–138.0°, was prepared for analysis by sublimation at 120° C./0.1 mm.

*Analysis.*—Calcd. for $C_9H_{11}N_5O_3$: C, 45.6; H, 4.67; N, 29.5. Found: C, 45.9; H, 4.78; N, 29.8.

Example IX.—1-N,N-dimethylcarbamyl-3-dimethylamino-1,2,4-triazole

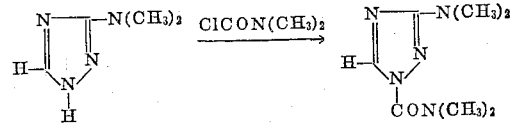

A mixture of 49 parts of 3-dimethylamino-1,2,4-triazole, 60.5 parts of triethylamine, 64 parts of dimethylcarbamyl chloride, and 420 parts of tetrahydrofuran was heated under reflux for five hours. The mixture was filtered and the solid salt was discarded. The solvent was removed from the filtrate by distillation and the cooled residue was filtered. The filtrate was diluted with benzene and the benzene solution was filtered. The filtrate was distilled to give 41.5 parts of 1-dimethylcarbamyl-3-dimethylamino-1,2,4-triazole, B.P. 155–159° C./10 mm. still containing a little solid. This distillate was diluted with 140 parts of ether and filtered. The filtrate was distilled to give 31.7 parts of material boiling at 146–148°/ 10 mm. that was still cloudy. The distillate was dissolved in 43 parts of ether and cooled to −80° C. The solid that crystallized was collected to give 22.9 parts of pure 1-dimethylcarbamyl-3-dimethylamino-1,2,4-triazole that melted to a clear liquid near 20°.

A small sample was distilled through a short path still to free it of solvent for analysis.

*Analysis.*—Calcd. for $C_7H_{13}N_5O$: C, 45.9; H, 7.16; N, 38.2. Found: C, 46.1; H, 7.21; N, 38.5.

The 3-dimethylamino-1,2,4-triazole used as starting material in the above was prepared by heating dimethylcyanamide with formhydrazide at 140° C. The product melted at 124–125° C.

*Analysis.*—Calcd. for $C_4H_8N_4$: C, 42.8; H, 7.19; N, 50.0. Found: C, 42.9; H, 7.16; N, 50.1.

Example X.—1-(N-methyl-N-n-butyl)carbamyl-3-acetamido-1,2,4-triazole

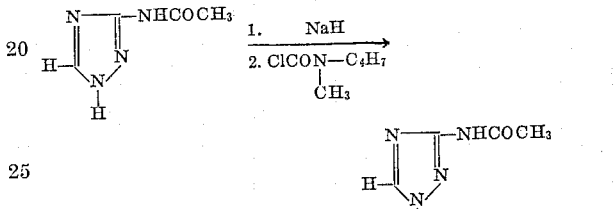

To a slurry of 4.3 parts of 56% sodium hydride dispersion in 288 parts of tetrahydrofuran was added 12.6 parts of 3-acetamido-1,2,4-triazole. The mixture was heated under reflux for 18 hours. A solution of 15 parts of methyl-n-butylcarbamyl chloride in 72 parts of tetrahydrofuran was added and refluxing was continued for an additional 5.5 hours. The mixture was filtered and solvent was removed from the filtrate by distillation. The residual oil crystallized when it was triturated with petroleum ether. The solid was crystallized from a benzene-cyclohexane mixture to give 15.5 parts of 1-(N-methyl-N-n-butyl)carbamyl-3-acetamido-1,2,4-triazole, M.P. 109.2–109.5°. A sample prepared for analysis by an additional crystallization from benzene-cyclohexane mixture followed by sublimation at 100°/0.1 mm. melted at 111.4–112.0°.

*Analysis.*—Calcd. for $C_{10}H_{17}N_5O_2$: C, 50.2; H, 7.16; N, 29.3. Found: C, 50.1; H, 7.23; N, 29.9.

Example XI.—1-N,N-dimethylcarbamyl-3-propionamido-1,2,4-triazole

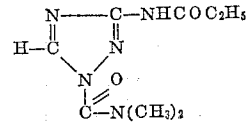

To a slurry of 22 parts of 56% sodium hydride dispersion in about 700 parts of tetrahydrofuran was added 70 parts of 3-propionamido-1,2,4-triazole. The mixture slowly evolved hydrogen when refluxed for 2½ hours. To the hot slurry was added 55 parts of dimethylcarbamyl chloride. More hydrogen was evolved and the mixture was stirred without heating overnight. The mixture was reheated to the reflux temperature and filtered hot. The solid was washed with 420 parts of warm tetrahydrofuran on the filter. The combined filtrate and washings were freed of tetrahydrofuran by distillation. The solid that remained was washed with petroleum ether and crystallized from an ethanol/benzene mixture (1:3) to give 48.7 parts of 1-dimethylcarbamyl-3-propionamido-1,2,4-triazole, M.P. 146.2–147.0°. A small sample was prepared for analysis by sublimation at 120°/0.1 mm.; M.P. 147.0–147.6°.

*Analysis.*—Calcd. for $C_8H_{13}N_5O_2$: C, 45.6; H, 6.21; N, 33.2. Found: C, 45.7; H, 6.57; N, 33.2.

The proton n-m-r spectrum of a 0.5 molal solution in CDCl₃ gave the following peaks: —0.1τ (area 1), 1.20τ (area 1), 6.68τ (area 6), quadruplet centered at 7.35τ (area 2), triplet centered at 8.72τ (area 3). The coupling constant between the multiples of the ethyl group was 8 cps.

The 3-propionamido-1,2,4-triazole used was prepared by the reaction of 3-aminotriazole with propionic anhydride. It melted at 272.5–274.0°.

*Analysis.*—Calcd. for $C_5H_8N_4O$: C, 42.9; H, 5.76; N, 40.0. Found: C, 43.2; H, 5.84; N, 39.6.

Example XII.—1-N,N-dimethylcarbamyl-3-trifluoroacetamido-1,2,4-triazole

To a mixture of 23.2 g. of 1-dimethylcarbamyl-3-amino-1,2,4-triazole, 300 ml. of tetrahydrofuran and 16.2 g. of triethylamine was added a solution of 28.8 g. of trifluoroacetic anhydride in 150 ml. of tetrahydrofuran over the course of 15 minutes while the reaction mixture was stirred and cooled in an ice bath. The mixture was stirred without cooling for 18 hours after the addition was complete. The mixture was then filtered to remove the triethylamine hydrochloride. The solvent was removed from the filtrate by distillation and the oil that remained solidified when it cooled. This solid was mixed with 75 ml. of ice water and the undissolved material was collected by filtration. This solid was crystallized from ethylene chloride and then from absolute ethyl alcohol to give 26.7 g. of 1-dimethylcarbamyl-3-trifluoroacetamido-1,2,4-triazole, M.P. 157–158°. A sample prepared for analysis by sublimation at 140°/0.1 mm. melted at 157–158°.

*Analysis.*—Calcd. for $C_7H_8F_3N_5O_2$: C, 33.5; H, 3.21; N, 27.9. Found: C, 33.8; H, 3.30; N, 28.1.

Example XIII.—1-N,N-dimethylcarbamyl-3-chloroacetamido-1,2,4-triazole

To a mixture of 23.2 g. of 1-dimethylcarbamyl-3-amino-1,2,4-triazole, 300 ml. of tetrahydrofuran and 16.2 g. of triethylamine was added a solution of 18.1 g. of chloroacetyl chloride in 100 ml. of tetrahydrofuran over the course of 15 minutes. During this addition the reaction mixture was cooled in an ice bath. When the addition was complete, the ice bath was removed and the mixture was stirred for an additional hour. The solid was removed from the reaction mixture by filtration and the filtrate was freed of solvent on a steam bath. The dark oil that remained, crystallized on cooling. This crude product was crystallized twice from ethylene chloride and once from ethylene chloride/benzene mixture to give 8.0 g. of 1-dimethylcarbamyl-3-chloroacetamido-1,2,4-triazole, M. P. 140.8–141.6°. A sample was prepared for analysis by two crystallizations from absolute ethyl alcohol. It melted at 141.2–141.8°.

*Analysis.*—Calcd. for $C_7H_{10}N_5O_2Cl$: C, 36.2; H, 4.35; N, 30.2. Found: C, 36.7; H, 4.24; N, 29.9.

Example XIV.—1-N,N-dimethylcarbamyl-3-dichloroacetamido-1,2,4-triazole

To a mixture of 15.5 g. of 1-dimethylcarbamyl-3-amino-1,2,4-triazole, 6 g. of calcium oxide and 200 ml. of tetrahydrofuran was added 15 g. of dichloroacetyl chloride. The mixture was heated under reflux for 5 minutes, and then filtered by suction. The cloudy filtrate was refiltered through a fluted filter paper to give a clear filtrate from which the solvent was removed by distillation to give a residue that crystallized. This solid was crystallized twice from absolute ethyl alcohol to give 10.2 g. of 1 - dimethylcarbamyl-3-dichloroacetamido-1,2,4-triazole, M.P. 165–165.8°. A sample prepared for analysis by sublimation at 150°/0.1 mm. melted at 165.2–166.2°.

*Analysis.*—Calcd. for $C_7H_9N_5O_2Cl_2$: C, 31.6; H, 3.41; N, 26.3. Found: C, 31.8; H, 3.43; N, 26.1.

Example XV.—1-N,N-dimethylcarbamyl-3-trichloroacetamido-1,2,4-triazole

To a mixture of 31.0 g. of 1-dimethylcarbamyl-3-amino-1,2,4-triazole, 400 ml. of tetrahydrofuran and 37 g. of trichloroacetyl chloride was added over the course of 10 minutes a solution of 21 g. of triethylamine in 75 ml. of tetrahydrofuran. The mixture was then stirred for 1 hour. Triethylamine hydrochloride that had recipitated was removed by filtration. The filtrate was freed of solvent by distillation and the residue was crystallized twice from absolute ethyl alcohol to give 49.9 g. of 1-dimethylcarbamyl-3-trichloroacetamido-1,2,4-triazole, M.P. 170.8–171.8°. A sample prepared for analysis by an additional crystallization from ethyl alcohol melted at 170.2–171°.

*Analysis.*—Calcd. for $C_7H_8N_5O_2Cl_3$: C, 28.0; H, 2.68; N, 23.3. Found: C, 28.4; H, 2.68; N, 23.5.

Example XVI.—1-dimethylcarbamyl-3-(cyclopropanecarboxamido)-1,2,4-triazole

To a mixture of 31.0 g. of 1-dimethylcarbamyl-3-amino-1,2,4-triazole, 300 ml. of tetrahydrofuran and 21 g. of triethylamine was added a solution of 21.5 g. of cyclopropanecarbonyl chloride in 75 ml. of tetrahydrofuran over the course of 10 minutes. The mixture was then stirred for an additional 2 hours and allowed to stand for 20 hours. The mixture was filtered and the filtrate was freed of solvent. The residue was recrystallized twice from benzene to give 16.3 g. of 1-dimethylcarbamyl-3-(cyclopropanecarboxamido)-1,2,4-triazole, M.P. 135.6–136.4°. A sample was prepared for analysis by an additional crystallization from benzene, M.P. 136.4–137.2°.

*Analysis.*—Calcd. for $C_9H_{13}N_5O_2$: C, 48.4; H, 5.87; N, 31.4. Found: C, 49.1; H, 5.82; N, 31.8.

Example XVII.—1-N,N-dimethylcarbamyl-3-(N-methylacetamido)-1,2,4-triazole

To a slurry of 11.3 g. of 53% sodium hydride dispersion in 400 ml. of tetrahydrofuran was added 49.3 g. of 1-dimethylcarbamyl-3-acetamido-1,2,4-triazole. The mixture was heated under reflux for three-quarters of an hour. The heat was removed and 37 g. of methyl iodide was added over the course of 5 minutes. The mixture was then heated under reflux for 16½ hours. The reaction mixture was filtered and the filtrate was freed of solvent by distillation. The amber oil that remained crystallized to a hydroscopic solid when it was triturated with petroleum ether. This solid was placed in a sublimer and 1-dimethylcabamyl - 3 - (N-methylacetamido)-1,2,4-triazole was collected as a sublimate at 150°/0.5 mm. It was crystallized once from isopropyl alcohol and then twice from a mixture of isopropyl alcohol and cyclohexane to give 3.7 g. of material, M.P. 80.0–80.7°.

A sample that was prepared for analysis by distillation in a sublimer tube at 110°/0.1 mm. melted at 80.8–81.5°.

*Analysis.*—Calcd. for $C_8H_{13}N_5O_2$: C, 45.5; H, 6.21; N, 33.2. Found: C, 45.5; H, 6.11; N, 33.2.

The n-m-r spectrum (1.0 M in deuterochloroform) showed methyl resonances of relative intensities of 3:6:3 at τ 6.52, 6.63 and 7.57 p.p.m. and a resonance of relative intensity of 1 at τ 1.06 p.p.m. completely in accord with the above structure.

Example XVIII.—1-N,N-dimethylcarbamyl-3-formamido-1,2,4-triazole

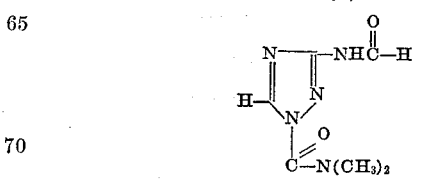

A mixture of 310 g. of 1-N,N-dimethylcarbamyl-3-amino-1,2,4-triazole, 600 ml. of toluene and about 195 ml. of formic acid was heated at reflux for a total of 6 hours with water removed by a trap. After cooling, the toluene was decanted and the solid crystallized twice from ethanol to give 240 g. of 1-dimethylcarbamyl-3-formamido-1,2,4-triazole, M.P. 126–126.6° C.

*Analysis.*—Calcd. for $C_6H_9N_5O_2$: C, 39.4; H, 5.0; N, 38.3. Found: C, 39.7; H, 5.0; N, 38.4.

The same compound was also obtained by reaction of dimethylcarbamyl chloride with 3-formamido-1,2,4-triazole. The latter compound was prepared as follows: To 336 g. of 3-amino-1,2,4-triazole was added 400 ml. of 98% formic acid. After refluxing for 4.5 hours, 200 ml. of liquid was removed by distillation and the remaining syrup poured into water and cooled. The crystalline 3-formamido-1,2,4-triazole was washed with absolute alcohol and dried, M.P. 201–202° C.

Example XIX.—1-(N-[4-n-propylpiperidino]carbonyl)-3-formamido-1,2,4-triazole

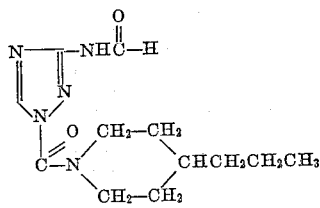

A mixture of 23 g. of 4-propylpiperidylcarbonyl chloride (obtained by reaction of 4-propylpiperidine and phosgene), 4.6 g. of 53% sodium hydride dispersion, 11.2 g. of 3-formamido-1,2,4-triazole and 100 ml. of tetrahydrofuran was refluxed for about 60 hours. The mixture was filtered, solvent removed and the residue recrystallized from benzene to give 9.2 g. of 1-(N-[4-n-propylpiperidino]carbonyl)-3 - formamido - 1,2,4 - triazole, M.P. 153.6–154.0° C.

*Analysis.*—Calcd. for $C_{12}H_{19}N_5O$: C, 54.3; H, 7.24; N, 26.4. Found: C, 54.5; H, 7.29; N, 26.2.

Example XX.—1-(N-methyl-N-isopropylcarbamyl)-3-formamido-1,2,4-triazole

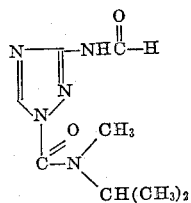

When the general procedure of the preceding example was repeated with methyl isopropyl carbamyl chloride, there was obtained 1-(N-methyl-N-isopropylcarbamyl)-3-formamido-1,2,4-triazole, M.P. 120.5–121.8° C.

*Analysis.*—Calcd. for $C_8H_{13}N_5O_2$: C, 45.5; H, 6.20; N, 33.2. Found: C, 45.6; H, 6.52; N, 33.4.

Example XXI.—1-(N-methyl-N-ethylcarbamyl)-3-formamido-1,2,4-triazole

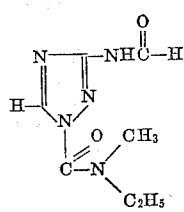

The general procedure of preceding Example XIX was repeated with methyl ethyl carbamyl chloride and there was obtained 1-(N-methyl-N - ethylcarbamyl) - 3 - formamido-1,2,4-triazole, M.P. 91–92.4° C.

*Analysis.*—Calcd. for $C_7H_{11}N_5O_2$: C, 42.7; H, 5.64; N, 35.5. Found: C, 42.7; H, 5.86; N, 35.9.

Example XXII.—1-(N-methyl-N-sec.-butylcarbamyl)-3-formamido-1,2,4-triazole

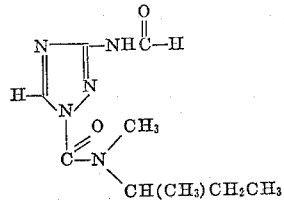

The general procedure of preceding Example XIX was repeated with methyl sec.-butyl carbamyl chloride to give 1-(N-methyl-N-sec.-butylcarbamyl)-3 - formamido - 1,2,4-triazole, M.P. 118–120° C.

*Analysis.*—Calcd. for $C_9H_{15}N_5O_2$: C, 48.0; H, 6.71; N, 31.1. Found: C, 47.6; H, 6.8; N, 31.2.

Example XXIII.—1-(N-piperidinocarbonyl)-3-formamido-1,2,4-triazole

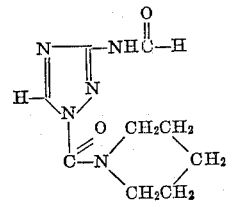

When the general procedure of Example XIX was repeated with 1-piperidyl carbonyl chloride, there was obtained 1-(N-piperidinocarbonyl)-3-formamido - 1,2,4-triazole, M.P. 126–127° C.

*Analysis.*—Calcd. for $C_9H_{13}N_5O_2$: C, 48.4; H, 5.87; N, 31.4. Found: C, 48.8; H, 5.78; N, 31.6.

Example XXIV.—1-(N-methyl-N-isopropylcarbamyl)-3-acetamido-1,2,4-triazole

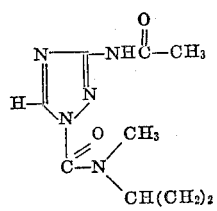

When the general procedure of Example XIX was repeated with methyl isopropyl carbamyl chloride, there was obtained 1-(N-methyl-N-isopropylcarbamyl)-3 - acetamido-1,2,4-triazole, M.P. 129.8–131.2° C.

*Analysis.*—Calcd. for $C_9H_{15}N_5O_2$: C, 48.0; H, 6.71; N, 31.1. Found: C, 48.0; H, 6.97; N, 31.2.

Example XXV.—1-(N-methyl-N-ethylcarbamyl)-3-acetamido-1,2,4-triazole

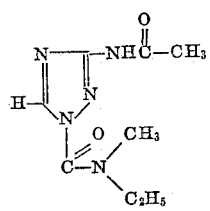

Repetition of the general procedure of Example XIX with methyl ethyl carbamyl chloride gave 1-(N-methyl-N-ethylcarbamyl)-3-acetamido - 1,2,4 - triazole, M.P. 97.5–99.5° C.

*Analysis.*—Calcd. for $C_8H_{13}N_5O_2$: C, 45.5; H, 6.20; N, 33.2. Found: C, 45.8; H, 6.43; N, 33.2.

Example XXVI.—1-(N-piperidinocarbonyl)-3-acetamido-1,2,4-triazole

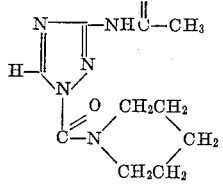

Repetition of the general procedure of Example XIX with piperidinocarbonyl chloride gave the above compound, M.P. 128.0–129.6° C.

*Analysis.*—Calcd. for $C_{10}H_{15}N_5O_2$: C, 50.5; H, 6.37; N, 29.5. Found: C, 50.9; H, 6.34; N, 29.8.

Example XXVII.—1-(N-pyrrolidinecarbonyl)-3-(N-methylacetamido)-1,2,4-triazole

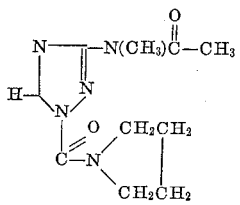

A mixture of 5.6 g. of 1-(N-pyrrolidinecarbonyl)-3-acetamido-1,2,4-triazole (see Example V), 1.4 g. of 53% sodium hydride dispersion, 7.0 g. of methyl iodide, and 100 ml. of tetrahydrofuran was heated at reflux for 20 hours. The mixture was filtered, and the filtrate was evaporated to dryness. Mineral oil was removed from the solid residue bp washing with petroleum ether. The solid was extracted with 150 ml. of chloroform, and evaporation of the chloroform extract gave solid which when crystallized from cyclohexane yielded 2.8 g. (44%) of 1-(N-pyrrolidinecarbonyl)-3-(N - methylacetamido) - 1,2,4 - triazole, M.P. 59.7–61.8°. A sample was prepared for analysis by recrystallization from cyclohexane, M.P. 62.9–63.8°.

*Analysis.*—Calcd. for $C_{10}H_{15}N_5O_2$: C, 50.6; H, 6.38; N, 29.6. Found: C, 50.5; H, 6.41; N, 30.0.

Example XXVIII.—1-(N-piperidinecarbonyl)-3-(N-methylacetamido)-1,2,4-triazole

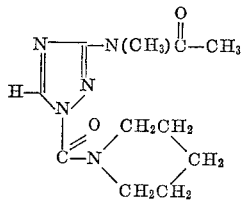

A mixture of 1-(N-piperidinecarbonyl)-3-acetamido-1,2,4-triazole (see Example XXV), 5.0 g. of 53% sodium hydride dispersion, 25 g. of methyl iodide, and 300 ml. of tetrahydrofuran was heated at reflux for 4 hours. The mixture was filtered, and the filtrate was evaporated to dryness on a steam bath. The solid that remained was freed of mineral oil by washing it with ligroin. The washed solid was extracted with 600 ml. of boiling chloroform. The filtered chloroform extract was reduced to dryness, and the solid that remained was crystallized from 200 ml. of cyclohexane to give 14.7 g. (59%) of 1-(N-piperidinecarbonyl)-3-(N - methylacetamido) - 1,2,4-triazole, M.P. 70.5–71.2°. An additional crystallization of a sample for analysis gave material melting at 70.6–71.1°.

*Analysis.*—Cacld. for $C_{11}H_{17}N_5O_2$: C, 52.6; H, 6.82; N, 27.9. Found: C, 52.8; H, 7.07; N, 27.9.

Triazoles having amino or substituted amino groups on nuclear nitrogen used in the processes yielding the new tertiary carbamyl derivatives on nuclear nitrogen are available by general methods described in the chemical literature. Reaction of such a triazole having hydrogen on nuclear nitrogen with an N,N-saturated dialiphatically substituted carbamyl (also named carbamoyl) halide takes place readily. Although the halogen can be the bromide, it is preferred that the chloride be used since this derivative is cheaper and more readily available. This reaction results in the production of hydrogen halide and an acid acceptor, preferably tertiary amine, should be present to remove this product. An alternative method as illustrated in preceding examples involves the use of an alkali metal hydride on the hydrogen-bearing triazole to give the corresponding alkali metal salt, which then reacts with the carbamyl halide to yield the desired N,N-disubstituted carbamyl triazole.

When the general procedure of Example XIX is repeated with other carbamyl halides (which are readily available by reaction of phosgene with the desired secondary amine), the folowing tabulation shows the compound obtained and the carbamyl halide employed:

1-(N-methyl-N-sec. hexylcarbamyl)-3-formamido-1,2,4-triazole from methyl-sec. hexylcarbamyl chloride;

1-(N-methyl-N-allylcarbamyl)-3-formamido-1,2,4-triazole from methyl allyl carbamyl chloride;

1-(N-methyl-N-2-methoxyethylcarbamyl)-3-formamido-1,2,4-triazole from methyl-2-ethoxyethyl carbamyl chloride;

1-(N-methyl-N-2-n-butoxyethylcarbamyl)-3-formamido-1,2,4-triazole from methyl-2-n-butoxyethyl carbamyl chloride;

1-(N-methyl-N-2-hydroxy-n-hexylcarbamyl)-3-formamido-1,2,4-triazole from methyl-2-hydroxy-n-hexylcarbamyl chloride;

1-(N-methyl-N-dimethylaminocarbamyl)-3-formamido-1,4-triazole from methyl-N-dimethylaminocarbamyl chloride;

1-(N-methyl-N-1-methyl-2-carboethoxyethylcarbamyl)-3-formamido-1,2,4-triazole from methyl-1-methyl-2-carboethoxyethyl carbamyl chloride;

1-(N-methyl-N-β-cyanoethylcarbamyl)-3-formamido-1,2,4-triazole from methyl-β-cyanoethylcarbamyl chloride;

1-(N-methyl-N-2-N,N-dimethylcarboxamidoethylcarbamyl)-3-formamido-1,2,4-triazole from methyl-2-N,N-dimethylcarboxamidoethylcarbamyl chloride;

1-(N-methyl-N-1-methyl-3-carboxamidopropylcarbamyl)-3-formamido-1,2,4-triazole from N-methyl-N-(1-methyl-3-carboxamidopropyl)-carbamyl chloride;

1-(N-methyl-N-1-methyl-4-carboethoxybutylcarbamyl)-3-formamido-1,2,4-triazole from N-methyl-N-1-methyl-4-carboethoxybutylcarbamyl chloride;

1-(N-methyl-N-1-ethyl-2-cyanopropylcarbamyl)-3-formamido-1,2,4-triazole from N-methyl-N-1-ethyl-2-cyanopropylcarbamyl chloride;

1-(N-methyl-N-1-methyl-4-N,N-diethylcarboxamidobutylcarbamyl)-3-formamido-1,2,4-triazole from N-methyl-4-N,N-diethylcarboxyamidobutylcarbamyl chloride;

1-(N-methyl-N-3-diethylaminopropylcarbamyl)-3-formamido-1,2,4-triazole from N-methyl-N-3-diethylaminopropylcarbamyl chloride;

1-(N-[1,2,3,6-tetrahydropyridino]carbonyl)-3-formamido-1,2,4-triazole from 1,2,3,6-tetrahydropyridinocarbonyl chloride (alternatively named as dehydropiperidines);

1-(N-[3-methyl-1-piperidino]carbonyl)-3-formamido-1,2,4-triazole from 3-methylpiperidinocarbonyl chloride;

1-(N-[3-ethyl-1-piperidino]carbonyl)-3-formamido-1,2,4-triazole from 3-ethylpiperidinocarbonyl chloride;

1-(N-[1-ethylnipecotato]carbonyl)-3-formamido-1,2,4-triazole from 1-ethylnipecotatocarbonyl chloride;

1-(N-[1-ethylisonipecotato]carbonyl)-3-formamido-1,2,4-triazole from 1-ethylisonipecotatocarbonyl chloride;

1-(N-[4-methylpiperidino]carbonyl)-3-formamido-1,2,4-triazole from 4-methylpiperidinocarbonyl chloride;

1-(N-[4-*n*-butylpiperidino]carbonyl)-3-formamido-1,2,4-triazole from 4-*n*-butylpiperidinocarbonyl chloride;

1-N-[4-trifluoromethylpiperindo]carbonyl)-3-formamido-1,2,4-triazole from 4-trifluoromethylpiperidinocarbonyl chloride;

1-(N-[4-cyclohexylmethylpiperidino]carbonyl)-3-formamido-1,2,4-triazole from 4-cyclohexylmethylpiperidinocarbonyl chloride;

1-(N-[4-benzylpiperindo]carbonyl)-3-formamido-1,2,4-triazole from 4-benzylpiperindocarbonyl chloride;

1-(N-[4-dimethylcarboxamidopiperidino]carbonyl)-3-formamido-1,2,4-triazole from 4-N,N-dimethylcarboxamidopiperidinocarbonyl chloride;

1-(N-[4-hydroxypiperindo]carbonyl)-3-formamido-1,2,4-triazole from 4-hydroxypiperidinocarbonyl chloride;

1-(N-[3-methyl-4-ethylpiperindo]carbonyl)-3-formamido-1,2,4-triazole from 3-methyl-4-ethylpiperidinocarbonyl chloride;

1-N-(4-*n*-nonylpiperidinocarbonyl)-3-formamido-1,2,4-triazole from 4-*n*-nonylpiperidinocarbonyl chloride;

1-N-(4-diethylaminoethylpiperidinocarbonyl)-3-formamido-1,2,4-triazole from 4-diethylaminoethylpiperidinocarbonyl chloride;

1-N-(4-ethoxyethylpiperidinocarbonyl)-3-formamido-1,2,4-triazole from 4-ethoxyethylpiperidinocarbonyl chloride;

1-N-(4-carbamylpiperidinocarbonyl)-3-formamido-1,2,4-triazole from 4-carbamylpiperidinocarbonyl chloride;

1-N-(4-diethylcarbamylethylpiperidinocarbonyl)-3-formamido-1,2,4-triazole from 4-diethylcarbamylethylpiperidinocarbonyl chloride;

1-N-(4-pyrrolidinomethylpiperidinocarbonyl)-3-formamido-1,2,4-triazole from 4-pyrrolidinomethylpiperidinocarbonyl chloride; and 1-N-(4-carbethoxyethylpiperidinocarbonyl)-3-formamido-1,2,4-triazole from 4-carboethoxyethylpiperidinocarbonyl chloride.

By use of available and appropriate intermediates the following compounds can be prepared by the procedures illustrated:

1-N-5-carboxypentyl-N-methylcarbamyl-3-formamido-1,2,4-triazole;

1-N-methyl-N-2-pentenylcarbamyl-3-formamido-1,2,4-triazole;

1-N-piperidinocarbonyl-3-(o-acetoxybenzamido)-1,2,4-triazole;

1-N-methyl-N-sec.-hexylcarbamyl-3-formamido-1,2,4-triazole;

1-N-methyl-N-sec.-hexylthiocarbamyl-3-formamido-1,2,4-triazole;

1-N-methyl-N-sec.-butylthiocarbamyl-3-formamido-1,2,4-triazole;

1-N-methyl-N-ethylthiocarbamyl-3-formamido-1,2,4-triazole;

1-N-(4-isopropylpiperidino)thiocarbonyl-3-N-methylformamido-1,2,4-triazole; and

1-N-pyrrolidinothiocarbonyl-3-formamido-1,2,4-triazole.

A further method involves the preparation of a suitable triazole having a carbonyl halide on nuclear nitrogen. According to this process, phosgene is reacted with a triazole having hydrogen on nuclear nitrogen and the corresponding triazole carbonyl chloride is treated with a saturated aliphatic secondary amine to give the desired N-disubstituted carbamyl triazole.

These reactions proceed under normal conditions, e.g., at temperatures of 0–100° C. and times of a few minutes to two or three days. Pressure equipment may be useful when the reaction is conducted above the boiling point of one of the ingredients of the reaction mixture. The reactions are generally conducted in an inert medium, which is a solvent for the reactants and/or reaction product.

Repetition of the procedure as outlined in Example I with the exception that 3-amino-5-methyl-1,2,4-triazole is used as the starting material gives 1-dimethylcarbamyl-3-amino-5-methyl-1,2,4-triazole.

When other disubstituted carbamyl halides replace dimethylcarbamyl chloride of the preceding descriptive examples, other 1-N,N-disubstituted carbamyl aminotriazoles are obtained. Thus, reacting N-morpholinocarbonyl chloride by the method of Example V gives the corresponding 1-N-morpholinocarbonyl-3-amino-1,2,4-triazole. The corresponding 1-N - morpholinocarbonyl - 3-acetamido - 1,2,4-triazole results from the process of Example VI.

By use of an alternative process, additional 1-disubstituted carbamyl aminotriazoles are readily available. Thus reaction of 3-acetamido-1,2,4-triazole with phosgene gives 3-acetamido - 1,2,4-triazolyl - 1-carbonyl chloride, which with N,O-dimethylhydroxylamine, methyl ethyl amine, and dehydropiperidine in the presence of triethylamine results in the formation of 1-N-methyl-N-methoxycarbamyl - 3-acetamido-1,2,4-triazole; 1-N-methyl-N-ethylcarbamyl - 3-acetamido - 1,2,4-triazole and 1-N-dehydropiperidylcarbonyl - 3-acetamido - 1,2,4-triazole. Similarly 3-acetamido - 1,2,4-triazolyl - 1-carbonyl chloride is reacted with 3-azabicyclo[3.2.2]nonane, 4-benzylpiperidine, 2-methylpiperidine, ethyl nipecotate, methyl-β-methoxyethylamine, or methyl n-hexylamine, there are formed 1-N - (3-azabicyclo[3.2.2]nonyl)-carbonyl - 3-acetamido-1,2,4-triazole, 1-(4 - benzylpiperidyl)-carbonyl - 3-acetamido - 1,2,4-triazole, 1-(2-methylpiperidyl)-carbonyl-3-acetamido - 1,2,4-triazole, 1-N-(ethyl nipecotyl)carbonyl-3-acetamido - 1,2,4-triazole, 1-N-methyl - N-β-methoxyethylcarbamyl - 3-acetamido - 1,2,4-triazole, and 1-N-methyl - N-n-hexylcarbamyl - 3-acetamido-1,2,4-triazole.

When 3-acetamido - 1,2,4-triazole or 3-formamido-1,2,4-triazole is reacted with dimethylthiocarbamyl chloride in the presence of triethylamine in an inert solvent, there is produced the corresponding 1-N,N-dimethylthiocarbamyl - 3-acetamido - 1,2,4-triazole or 1-N,N-dimethylthiocarbamyl - 3-formamido - 1,2,4-triazole.

Using the general procedure of Example IX except that 3-diethylamino - 1,2,4-triazole, 3-methylethylamino-1,2,4-triazole, and 3-N-pyrrolidyl - 1,2,4-triazole (available from reaction of formhydrazide with diethylcyanamide, ethylmethylcyanamide, and N-tetramethylenecyanamide), there are produced the corresponding 1-dimethylcarbamyl - 3-diethylamino - 1,2,4-triazole, 1-dimethylcarbamyl - 3-ethylmethylamino - 1,2,4-triazole, and 1-dimethylcarbamyl - 3-N-pyrrolidyl - 1,2,4-triazole.

The general technique of Example IX can likewise be used for the preparation of triazoles having substituents in the 3- and 5-positions. Thus if dimethylcyanamide is reacted with the hydrazide of ethyl formate (i.e., formhydrazide) or methyl carbonate (i.e., ethoxycarbonylhydrazine), there results the 3-dimethylamino-5-ethyl-1,2,4-triazole or 3-dimethylamino - 5 - methoxy-1,2,4-triazole which upon reaction with dimethylcarbamyl chloride give 1-N,N-dimethylcarbamyl - 3 - dimethylamino-5-ethyl-1,2,4-triazole and 1-N,N-dimethylcarbamyl-3-dimethylamino-5-methoxy-1,2,4-triazole.

When 3-amino-5-carboxy-1,2,4-triazole is reacted with dimethylcarbamyl chloride, the compound produced is 1-dimethylcarbamyl-3-amino-5-carboxy-1,2,4-triazole. The corresponding esters are also available, e.g., 1-dimethylcarbamyl-3-amino-5-carbethoxy-1,2,4-triazole starting with the ethyl ester. Treatment of carboxytriazoles with ammonia produces the corresponding 1-dimethylcarbamyl-3-amino-5-carbamyl-1,2,4-triazole.

By the diazotization of one amino group of guanazole, the corresponding 3-amino-5-diazonium-1,2,4-triazole salt is obtained. Treatment with halogen acid such as hydrochloric, hydrofluoric or hydrobromic produces the corresponding halide from which reaction with dimethylcarbamyl chloride gives 1-dimethylcarbamyl-3-amino-5-chloro-1,2,4-triazole, 1-dimethylcarbamyl-3-amino-5-fluoro-1,2,4-triazole or 1-dimethylcarbamyl-3-amino-5-bromo-1,2,4-triazole.

The compounds of this invention have outstanding activity as analgesics as determined by standard tests. In fact, some of the compounds are more potent than morphine. The compounds do not exhibit narcotic effects in animals. The compounds are relatively non-toxic, having therapeutic ratios that are generally quite large. For example, 1-(N-methyl-N-sec.-butylcarbamyl)-3-formamido-1,2,4-triazole (Example XXII) is at least 200 times more active in analyesic activity than is morphine is standard Hot Plate tests in mice. In addition, the above compound has therapeutic ratios of 4,200 to 10,000 as compared with 10–60 for morphine.

The analgesic activity is demonstrated in a standard Phenylquinone test described by Siegmund et al.., Proc. Soc. Exp. Biol. Med., 95, 729–31 (1957). Another test for analgesic activity is the Hot Plate test described by Eddy, J.P.E.T., 98, 121–137 (1950). Application of radiant heat to test animals has been used according to Bass and Brook, J. Amer. Pharmaceut. Assoc., 41 (10), 569 (1952).

For analgesic properties it is necessary that the carbon atom of both $R^1$ and $R^2$ that is attached to the N is an aliphatic carbon. For when $R^1$ or $R^2$ is hydrogen, as in 1-methylcarbamyl-1,2,4-triazole, no analgesic activity was recorded in the Hot Plate test. Moreover it has been found that the positioning of an amino group in the 5-position of the triazole, as in, for example, 1-N,N-dimethylcarbamyl-5-amino-1,2,4-triazole, does not produce analgesic effect to classify such compounds as useful analgesic agents.

In addition to analgesic action, the compounds are active as anti-inflammatory agents. As determined by the Cotton Pellet Granuloma test generally described by Dulin in Proc. Soc. Exp. Biol. Med., 90, 115 (1955), this activity is greater for some of these new triazoles than that of the adrenocortical steroids, e.g., 1-N,N-dimethylcarbamyl-3-acetamido-1,2,4-triazole when given intramuscularly has a minimum effective dose of one fourth that of cortisone and almost a tenth of that of phenylbutazone. 1-N,N-dimethylcarbamyl-3-amino-1,2,4-triazole is quite active in this test when administered by oral, intramuscular, or intraperitoneal routes. This potency is remarkable for a non-steroid nucleus.

In pharmaceutical application a compound of this invention will be administered to the body orally, parenterally and by other methods. The dosage will vary and will depend on such factors as the condition being treated; age and weight of the recipient; the responsiveness of the recipient; prior, concurrent and intended subsequent medication and treatment; general health of the recipient; frequency of treatment; and of course the nature of the effect desired.

Generally speaking, the active compound will be administered in a physiologically beneficial amount. Administration can be in a single dose or in a plurality of doses over an extended period of time. It will furthermore be understood that every compound within this invention does not have an identical level of dosage requirement for effectiveness and therefore experts will understand that some dosage variation between compounds can be expected for maximum benefits. It will of course also be understood that an initial dose, or first group of doses, in a course of treatment can be in greater amounts, if appropriate, and a rapid response is sought by the early administration of relatively large doses and thereafter the minimally effective dosage, or maintenance dosage, is determined.

A single dose will rarely exceed about 100 or 200 milligrams of active compound within this invention, although larger amounts can be used as called for in any given situation. Extremely small doses will effect some benefit but as a practical matter a single dose of less than about 0.5 to 1 milligram will seldom be used. For treating small animals with high physiological response and using highly active compounds, routine usage can be at much lower dosage levels however. Doses can be repeated in the same or greater or lesser amounts over a period of time as long as improvement in the recipient is observed or as long as needed under the circumstances.

The compounds will ordinarily be administered with a non-toxic pharmaceutical carrier in a variety of practical dosage forms. These dosage forms are novel compositions comprising the non-toxic pharmaceutical carrier and a physiologically beneficial amount of one or more active compounds. These highly useful dosage forms constitute an important aspect of the present invention.

Suitable non-toxic pharmaceutical carriers or vehicles include liquids such as water, aromatic water, alcohols, syrups, elixirs, pharmaceutical mucilages, such as acacia and tragacanth, oils such as of petroleum, animal, vegetable or synthetic origin, for example, peanut oil, soybean oil, fish oil such as cod liver oil, or the like, for oral administration; water, saline, aqueous lactose, aqueous maltose, aqueous glucose (dextrose), aqueous sucrose, or the like, for administration by injection. Suitable solid carriers, include soft gelatin capsules, hard gelatin capsules, slow or delayed release pills or capsules, powders, tableting vehicles and the like. Suitable solid or liquid non-toxic pharmaceutical carriers are well known in the art and the selection of carrier can be from those appropriate and available in accordance with well-known prescription techniques. The compositions of this invention therefore include such dosage forms as solutions, suspensions, syrups, elixirs, tablets, capsules, powder packets, and the like.

A vast number of suitable pharmaceutical carriers are described in "Remington's Practice of Pharmacy," edited by E. W. Martin and E. F. Cook, 12th edition, 1961, published by the Mack Publishing Company, Easton, Pa.

In these novel compositions a new compound of this invention will be present in a physiologically beneficial amount as mentioned above. In practice this means that the active ingredient will ordinarily constitute at least about 0.001% by weight based on the total weight of the composition. For oral administration in water or other liquid medium, the concentration will ordinarily be in the range from about 0.001 to 5.0% by weight of active ingredient. For injection concentrations from 0.05 to 5.0% are satisfactory. In tablets, powders, capsules and the like the amount of active ingredient may if desired be as much as 95 or 98% or more by weight of the total composition.

The active compounds of this invention can be formulated if desired with one or more pharmaceutically active materials for combination effects, treatments and benefits. Such materials include but are by no means limited to vitamins, pain killers, tranquilizers, antibiotics, antitussive agents, etc. The compositions can of course contain suitable pharmaceutical modifiers such as coloring agents, sweetening or other flavoring agents, solubilizing agents, etc., as will readily occur to persons skilled in this art.

The following further illustrate specific pharmaceutical compositions for administration to a living body:

Example A

1 - N,N,-dimethylcarbamyl - 3 - amino-1,2,4-triazole is formulated conveniently as an injectable solution of 0.5%, 1%, and 5% by weight concentration in isotonic saline; as an injectable solution in 0.5%, 1%, and 5% by weight concentrations in aqueous sugars including in separate solutions lactose, maltose, glucose, and sucrose; in water in 0.1%, 0.2%, 0.3%, 0.4%, and 1% by weight concentration for oral administration, with and without a flavoring agent, a coloring agent, an antitussive agent, etc.; and in 5, 10, 25 and 50 milligram amounts in standard two-piece hard gelatin capsules with and without a diluent such as starch mannitol or lactose, for oral administration. In pharmacologic applications it is administered in these dosage forms at dosage levels in the range of 25–50 milligrams for treatment of physiologic conditions as described above.

1 - N,N-dimethylcarbamyl - 3 - acetamido-1,2,4,- triazole can be similarly formulated.

Example B

1 - N,N - dimethylcarbamyl - 3 - acetamido - 1,2,4-triazole can be formulated with suitable tableting adjuvants using a conventional tableting machine with the active ingredient constituting 5–50% by weight of the tablet. Other ingredients include gelatin, magnesium stearate, and starch or mannitol. Because of its higher analgesic and anti-inflammatory activity, this compound can be administered at lower doses than 1-N,N-dimethylcarbamyl-3-amino-1,2,4-triazole.

Other compounds which can be similarly formulated include 1 - (1-pyrrolidinecarbonyl)-3-formamido-1,2,4-triazole, 1 - (1-pyrrolidinecarbonyl)-3-acetamido-1,2,4-triazole, and 1 - (1-piperidinecarbonyl)-3-acetamido-1,2,4-triazole.

Example C

1 - (1 - pyrrolidinecarbonyl)-3-acetamido-1,2,4-triazole can be formulated conveniently as an injectable solution of 0.5% and 1% by weight concentration in a solvent consisting of 10% ethyl alcohol by volume, 20% propylene glycol by volume, and isotonic saline.

Other compounds that can be formulated similarly include 1 - (1 - pyrrolidinecarbonyl) - 3-amino-1,2,4-triazole and 1 - (1-piperidinecarbonyl)-3-acetamido-1,2,4-triazole. Although such compounds as 1-N,N-dimethylcarbamyl-3 - amino - 1,2,4 - triazole and its acetyl derivative can be formulated in the same manner, the latter are sufficiently water-soluble to be employed in aqueous isotonic saline without added solubilizing agents as previously shown.

Example D 1-(N-methyl-N-sec.-butylcarbamyl) - 3 - formamido-1,2,4-triazole can be formulated in a soft gelatin capsule by dissolving the compound in polyethylene glycol (of molecular weight of about 400) in concentrations of 1.0 to 10% weight/volume. The solution containing the compound is injected into the gelatin to form the capsule using a positive displacement pump set to deliver a specific volume depending on the dose required. The capsules are then dried before use.

Capsules prepared thus can be administered from 1 to 6 times daily to patients for relief of various types of pain. Other compounds which can be similarly formulated include 1-(N-methyl-N-isopropylcarbamyl) - 3 - formamido-1,2,4-triazole and 1-(N - methyl - N - ethylcarbamyl)-3-acetamido-1,2,4-triazole.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A 1,2,4-triazole having the formula

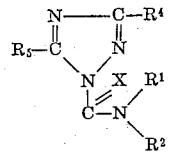

wherein
(A) X is of the group consisting of oxygen and sulfur,
(B) when $R^1$ and $R^2$ are considered individually, $R^1$ is methyl and $R^2$ is of the group consisting of alkyl of 1–6 carbon atoms, alkenyl of 2–6 carbon atoms, alkoxyalkyl of 2–6 carbon atoms, hydroxyalkyl of 1–6 carbon atoms, methylalkylamino of 2–6 carbon atoms, alkylaminoalkyl of 2–8 carbon atoms, carbalkoxyalkyl having 1–4 carbon atoms in the alkoxy portion and 1–6 carbon atoms in the alkyl portion, carbonamidoalkyl having 1–6 carbon atoms in the alkyl portion and 1–5 carbon atoms in the amido portion, and cyanoalkyl having 1–6 carbon atoms,
(C) when $R^1$ and $R^2$ are joined together, a heterocyclic ring is formed with the carbamyl nitrogen, said ring being selected from the class consisting of morpholino, pyrrolidyl, piperidyl, dehydropiperidyl, 3-azabicyclo-(3.2.2)nonyl, monosubstituted piperidyl of the formula

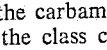

wherein $Y^1$ is of the class consisting of hydrogen and —$CH_3$,
$Y^2$ is of the class consisting of hydrogen, —$CH_3$, —$C_2H_5$ and —$COOR^3$ where $R^3$ is alkyl of 1–4 carbon atoms, and
$Y^3$ is hydrogen, hydroxyl, alkyl of 1–9 carbon atoms, cycloalkylalkyl of 4–9 carbon atoms, hydroxyalkyl of 1–9 carbon atoms, alkoxyalkyl of 2–9 carbon atoms, trifluoromethyl, —$COOR^3$ where $R^3$ is alkyl of up to 4 carbon atoms,

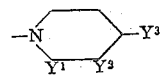

where $R^6$ and $R^7$ are alkyl of 1–4 carbon atoms, carboxyalkyl of 2–5 carbon atoms, dialkylaminoalkyl having a total of up to 8 carbon atoms, pyrrolidinomethyl and arylalkyl of 7–9 carbon atoms, and disubstituted piperidyl of the formula

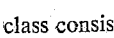

wherein $Y^2$ and $Y^3$ are defined the same as above,
(D) $R^4$ is of the class consisting of —$NH_2$, $NHR^6$, $NR^6R^7$, $NR^8COR^9$, and

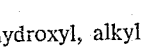

wherein $R^6$ and $R^7$ are of the class consisting of alkyl of 1–4 carbon atoms and aryl of 6 to 10 carbon atoms; $R^8$ is of the class consisting of hydrogen and alkyl of 1–4 carbon atoms, $R^9$ is of the class consisting of hydrogen, alkyl of 1–4 carbon atoms, aryl of 6–10 carbon atoms, carboxyalkyl of 2–6 carbon atoms, perfluoroalkyl of 1–4 carbon atoms and haloalkyl of 1–4 carbon atoms, and $R^{10}$ is alkylene of 2–5 carbon atoms, and
(E) $R^5$ is of the class consisting of hydrogen, halogen, alkyl of 1–4 carbon atoms, alkoxy of 1–4 carbon atoms, carboxy and —$CONH_2$.

2. 1-N,N-dimethylcarbamyl-3-amino-1,2,4-triazole.

3. 1-(N-methyl-N-sec.-butylcarbamyl) - 3 - formamido-1,2,4-triazole.

4. 1-(1-(1-pyrrolidylcarbonyl) - 3 - acetamido-1,2,4-triazole.

5. 1-(1-piperidylcarbonyl) - 3 - formamido-1,2,4-triazole.

6. 1-(1-4-n-propylpiperidylcarbonyl) - 3 - formamido-1,2,4-triazole.

7. A 1,2,4-triazole of the formula

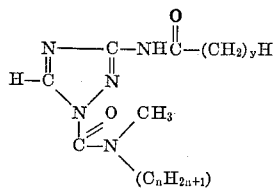

wherein $y$ is a cardinal number selected from the group consisting of 0 and 1; and $n$ is a cardinal number of 1 through 4, inclusive.

8. The triazoles of claim 7 wherein $y$ is 0.

9. The triazoles of claim 7 wherein $y$ is 1.

10. A process for preparing a 1,2,4-carbamyl triazole of claim 1 which comprises treating a triazole of the formula

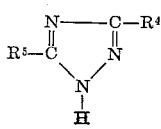

wherein $R^4$ and $R^5$ are defined as in claim 1, with an alkali metal hydride, followed by treatment with an N-disubstituted carbamyl halide of the formula

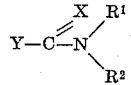

wherein X, $R^1$ and $R^2$ are defined as in claim 1, and Y is halogen; wherein each step is carried out at a temperature between about 0° to 100° C.

11. The process of claim 10 carried out in the presence of an inert solvent.

References Cited

UNITED STATES PATENTS

| | | | |
|---|---|---|---|
| 3,086,855 | 4/1963 | Knusli et al. | 260—71.5 |
| 3,141,757 | 7/1964 | Metivier et al. | 260—71.5 |
| 3,156,399 | 1/1965 | Lutz et al. | 260—71.5 |
| 3,222,159 | 12/1965 | Reicheneder et al. | 260—71.5 |

FOREIGN PATENTS

| | | |
|---|---|---|
| 576,586 | 7/1959 | Belgium. |
| 1,193,374 | 4/1959 | France. |
| 919,458 | 2/1963 | Great Britain. |

OTHER REFERENCES

Elderfield: Heterocyclic Compounds, vol. 7, Wiley, 1961, pp. 450–1 and 456–7.

Wagner et al.: Synthetic Organic Chemistry, Wiley, 1953, pp. 646–7.

ALEX MAZEL, *Primary Examiner.*

R. J. GALLAGHER, *Assistant Examiner.*